United States Patent
Lai (10) Patent No.: US 8,817,619 B2
(45) Date of Patent: Aug. 26, 2014

(54) NETWORK SYSTEM WITH QUALITY OF SERVICE MANAGEMENT AND ASSOCIATED MANAGEMENT METHOD

(75) Inventor: Chi Shao Lai, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 971 days.

(21) Appl. No.: 12/492,133

(22) Filed: Jun. 25, 2009

(65) Prior Publication Data

US 2009/0323532 A1     Dec. 31, 2009

(30) Foreign Application Priority Data

Jun. 27, 2008   (TW) ............................... 97124022 A (51) Int. Cl.
*H04L 1/00*     (2006.01)
*H04L 12/56*    (2006.01)

(52) U.S. Cl.
CPC ............... *H04L 47/10* (2013.01); *H04L 47/26* (2013.01); *H04L 47/20* (2013.01); *H04L 47/2441* (2013.01); *H04L 47/2433* (2013.01)
USPC ............................ 370/235; 370/231; 370/412

(58) Field of Classification Search
CPC ............. H04L 1/00; H04L 12/26; H04J 1/16; H04J 3/14
USPC .......................................................... 370/235
See application file for complete search history.

(56) References Cited

U.S. PATENT DOCUMENTS

| | | | |
|---|---|---|---|
| 6,182,183 B1 | 1/2001 | Wingard et al. | |
| 6,725,313 B1 | 4/2004 | Wingard et al. | |
| 7,120,712 B2 | 10/2006 | Wingard et al. | |
| 7,165,094 B2 | 1/2007 | Weber et al. | |
| 7,181,556 B2 | 2/2007 | Gwilt | |
| 7,191,273 B2 | 3/2007 | Weber | |
| 2002/0129173 A1* | 9/2002 | Weber et al. | 709/310 |
| 2005/0096970 A1* | 5/2005 | Weber | 705/11 |
| 2005/0138252 A1* | 6/2005 | Gwilt | 710/110 |
| 2008/0021721 A1* | 1/2008 | Jones et al. | 705/1 |
| 2008/0052590 A1* | 2/2008 | Amlekar | 714/748 |

* cited by examiner

*Primary Examiner* — Ayaz Sheikh
*Assistant Examiner* — Hai-Chang Hsiung
(74) *Attorney, Agent, or Firm* — McClure, Qualey & Rodack, LLP (57) ABSTRACT

A network system with QoS management and an associated management method are provided. The network system comprises a switch network, a target device, and at least a source device for issuing a packet to the target device via the switch network. The switch network comprises a flow control unit, a switch unit and a scheduling unit. The flow control unit determines whether to output a high priority packet according to a target priority level and a high priority bandwidth quota of the source device, and directly outputs a low priority packet. The switch unit determines a packet forwarding sequence according to a packet arbitration policy. The scheduling unit determines the sequence for packets to enter the target device. The scheduling unit updates the target priority level as the priority level of a packet entering the target device, and informs the flow control unit of the updated target priority level.

26 Claims, 5 Drawing Sheets

NETWORK SYSTEM WITH QUALITY OF SERVICE MANAGEMENT AND ASSOCIATED MANAGEMENT METHOD

BACKGROUND OF THE INVENTION (a). Field of the Invention

The invention relates to communication networks, and more particularly to a network system with quality of service (QoS) management and an associated QoS management method.

(b). Description of the Prior Arts

In recent years, the integrated circuit (IC) technology develops rapidly so that the System-on-Chip (SoC) approach is increasingly applied. The Network-on-Chip (NoC) architecture has also been developed to serve as the communication basis between system components. Since both the number of components and the need for bandwidth within a chip increase rapidly, the point-to-point standard protocol such as Open Core Protocol (OCP) or Advanced extensible Interface (AXI) is applied to the interface between the components so as to upgrade the working frequency and throughput of a NoC system. The physical layer of the NoC system utilizes point-to-point handshaking to control data flow and perform one-way phased transmission. The packet information provided by the standard protocol is used to facilitate data transmission and further provide the Quality of Service (QoS) function for data exchange. Packets, used for data exchange between the system components, may have different communication requirements depending on the involved components or tasks. For example, some of the packets need to be transmitted to their destination without too much delay so as to achieve a high data rate; the other packets may allow more delay in the transmission process.

Figure 1:
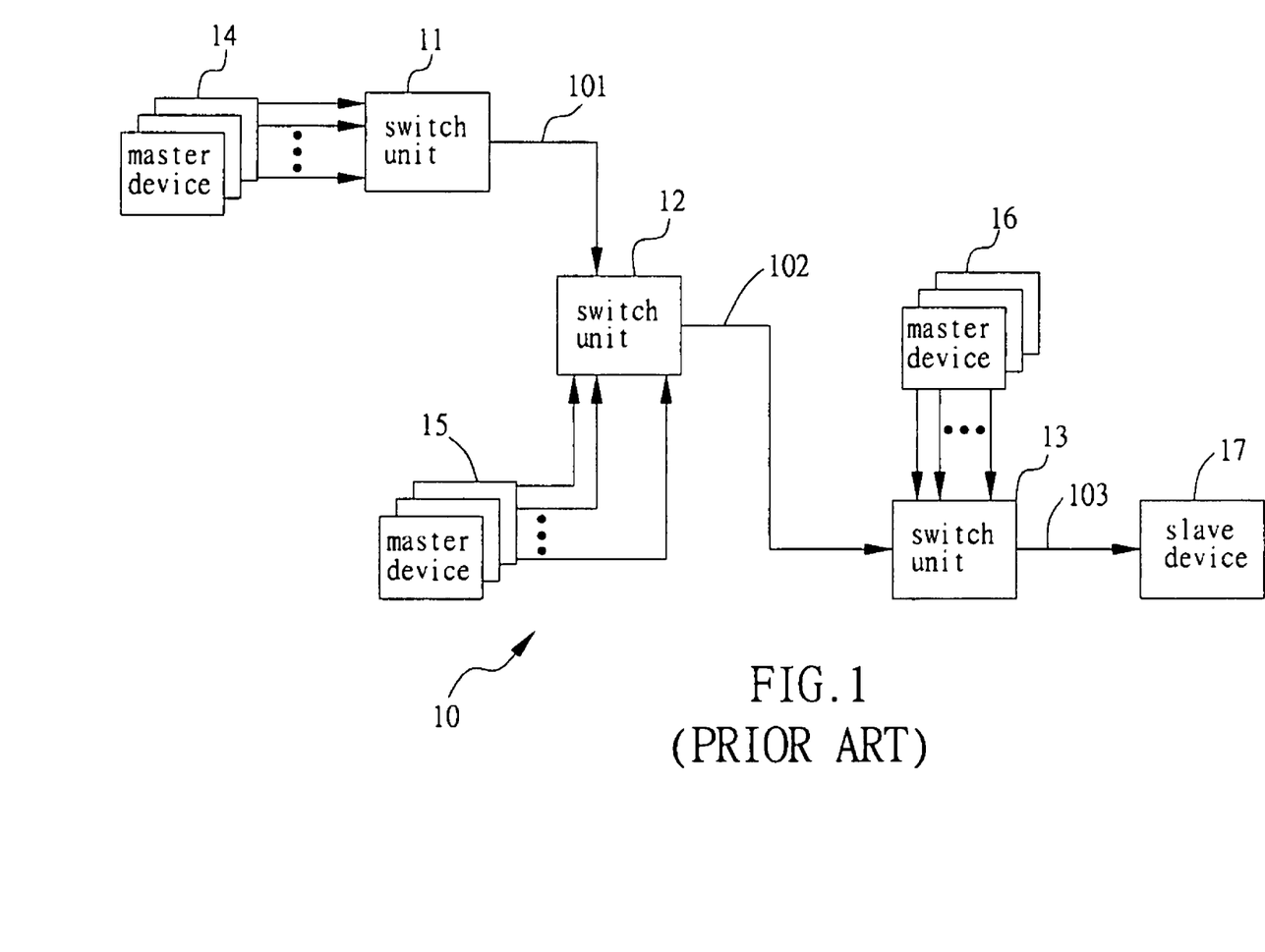
FIG. 1 is an architecture diagram of a conventional NoC system.

FIG. 1 is an architecture diagram of a conventional NoC system 10, which includes switch units 11, 12 and 13, master devices 14, 15 and 16 and a slave device 17. The NoC system 10 adopts a multi-level, switch-to-switch structure wherein each switch unit forms a center of a cluster or communication sub-system, and one-way point-to-point shared signal paths 101, 102 and 103 respectively connect between the switch units 11 and 12, the switch units 12 and 13, and the switch unit 13 and the slave device 17, thereby transmitting packets across different levels. Since each switch unit may receive packets from multiple sources (including the master device and the switch unit at the previous level) at the same time and also the signal paths 101, 102 and 103 are shared, the switch unit should consider various communication requirements of the received packets so as to establish its packet arbitration policy for determining the forwarding sequence of the received packets. However, in the architecture of FIG. 1, when a lot of high priority packets crowd into the switch unit, it may cause collision of packet forwarding or even network congestion such that the forwarding of the high priority packets cannot meet QoS requirements of the system. Furthermore, since the high priority packet is forwarded in a higher priority than a low priority packet, the forwarding of the low priority packet may be delayed too much and thus cannot meet the QoS requirements either.

SUMMARY OF THE INVENTION

It is therefore one objective of the present invention to provide a network system with quality of service (QoS) management and an associated QoS management method which can realize QoS requirements of high and low priority packets by means of dynamic management and division of labor, thereby achieving the QoS goal of the whole network system.

In one embodiment of the present invention, a network system is provided. The network system comprises: a switch network; a target device coupled to the switch network, wherein the target device is corresponding to a target priority level; and a first source device and a second source device for respectively issuing a first packet and a second packet to the target device via the switch network, wherein the first packet is corresponding to a first priority level. The switch network comprises: a flow control unit, coupled to the first source device, for receiving the first packet, and performing a flow control procedure according to the target priority level and a high priority bandwidth quota of the first source device when the first priority level is a high priority, so as to determine whether to output the first packet; when the first priority level is a low priority, the flow control unit directly outputs the first packet; a switch unit, coupled to the flow control unit and the second source device, for determining a forwarding sequence of the first and second packets according to a packet arbitration policy; and a scheduling unit for receiving the first and second packets from the switch unit and determining a sequence for the first and second packets to enter the target device, wherein the scheduling unit updates the target priority level as a priority level of a packet which enters the target device, and informs the flow control unit of the updated target priority level.

In another embodiment of the invention, a network system is provided. The network system comprises: a switch network; a target device coupled to the switch network, wherein the target device is corresponding to a target priority level; and a first source device and a second source device for respectively issuing a first packet and a second packet to the target device via the switch network, wherein the first packet is corresponding to a first priority level. The switch network comprises: a flow control unit, coupled to the first source device, for determining whether to output the first packet according to the first priority level and the target priority level, so as to control an output flow of the first packet; and a determining unit, coupled to the flow control unit and the second source device, for determining a sequence for the first and second packets to enter the target device according to a packet arbitration policy. The determining unit updates the target priority level after the first packet or the second packet enters the target device, so as to enable the flow control unit to dynamically adjust the output flow of the first packet.

In another embodiment of the invention, a Quality of Service (QoS) management method used in a network system is provided. The network system comprises a first source device, a second source device, a target device corresponding to a target priority level, a flow control unit, a switch unit and a scheduling unit. The QoS management method comprises steps of: the first source device issuing a first packet to the flow control unit, and the second source device issuing a second packet to the switch unit, wherein the first packet is corresponding to a first priority level; the flow control unit performing a flow control procedure according to the target priority level and a high priority bandwidth quota of the first source device when the first priority level is a high priority level, so as to determine whether to output the first packet to the switch unit; the flow control unit directly outputting the first packet to the switch unit when the first priority level is a low priority level; the switch unit determining a sequence for the first and second packets to be forwarded to the scheduling unit; the scheduling unit determining a sequence for the first and second packets to enter the target device; and the scheduling unit updating the target priority level as a priority level of a packet when the packet enters the target device, and informing the flow control unit of the updated target priority level.

DETAILED DESCRIPTION OF THE INVENTION

Figure 2:
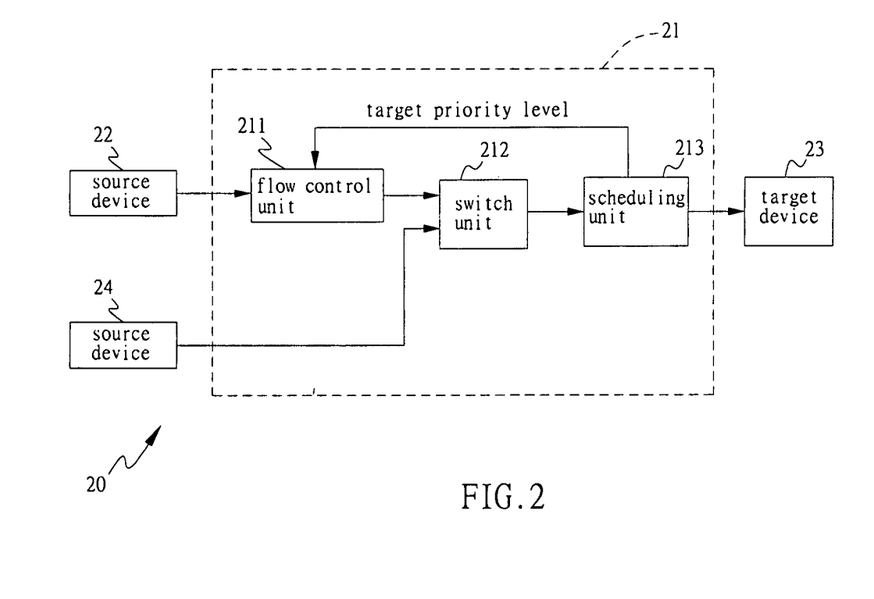
FIG. 2 is a diagram showing the architecture of one embodiment of the network system with QoS management according to the present invention.

FIG. 2 is a diagram showing the architecture of one embodiment of the network system with QoS management according to the present invention, wherein the network system 20 comprises a switch network 21, source devices 22 and 24 coupled to the switch network 21, and a target device 23. The source devices 22 and 24 are master devices, while the target device 23 is a slave device. The source devices 22 and 24 can respectively issue a first packet and a second packet to the target device 23 via the switch network 21, so as to communicate with the target device 23 or request a service of the target device 23. The network system 20 is provided with a plurality of priority levels that include at least one high priority level and one low priority level. The first packet, the second packet and the target device 23 are corresponding to one of the plurality of priority levels respectively. The corresponding priority level of the target device 23 represents the corresponding priority level of its currently received packet. When receiving the first and second packets, the switch network 21 utilizes the priority level information and bandwidth quotas allocated to the source devices 22 and 24 to perform QoS management, so as to forward the first and second packets to the target device 23. The first and second packets can be forwarded according to a point-to-point standard protocol such as Open Core Protocol (OCP) or Advanced extensible Interface (AXI).

The switch network 21 comprises a flow control unit 211, a switch unit 212 and a scheduling unit 213. The flow control unit 211 is coupled to the source device 22, and receives the first packet therefrom. When the corresponding priority level of the first packet (denoted as a first priority level below) is a low priority level, it means the first packet is a low priority packet, and the flow control unit 211 directly outputs the first packet to the switch unit 212 accordingly; when the first priority level is a high priority level, it means the first packet is a high priority packet, and the flow control unit 211 performs a flow control procedure according to the corresponding priority level of the target device 23 (denoted as a target priority level below) and a high priority bandwidth quota allocated to the source device 22, so as to determine whether to output the first packet. The high priority bandwidth quota represents the number of high priority packets or the data volume included in the high priority packet which is allowed for the source device 22 to output during a period of time. On the other hand, the second packet issued from the source device 24 is the low priority packet which is directly forwarded to the switch unit 212 without passing through the flow control unit 212. Thus, the flow control procedure of the flow control unit 211 is executed for the high priority packet, while the low priority packet is directly forwarded to the switch unit 212, which then performs packet arbitration to determine the forwarding sequence of the low priority packet (described in detail later).

When the flow control unit 211 performs the flow control procedure, if the high priority bandwidth quota of the source device 22 is not used up, the flow control unit 211 will determine whether to output the first packet according to a comparison result of the target priority level of the target device 23 and the first priority level of the first packet. For example, when the first priority level is higher than or equal to the target priority level, it is determined to output the first packet; when the first priority level is lower than the target priority level, it is determined not to output the first packet. The purpose of comparing the target priority level and the first priority level is as follows: if the network system 20 is extended to comprise plural source devices and flow control units (i.e. each source device capable of issuing the high priority packet is provided with a corresponding flow control unit) and also if the high priority packet issued from each source device is given a distinct priority level, then after a first high priority packet issued by some source device reaches the target device 23, a second high priority packet issued by another source device can be delayed for a period of time before being outputted by the corresponding flow control unit of the another source device. This is because the corresponding flow control unit of the another source device can delay the output of the second high priority packet according to a comparison result of the priority level of the second high priority packet and the target priority level, which is the priority level of the first high priority packet at this time. In this manner, it can be avoided that the high priority packets issued from multiple source devices are simultaneously outputted to the switch unit 212 to cause a collision, and thus the situation that low priority packets cannot be forwarded by the switch unit 212 can also be avoided.

When the flow control unit 211 performs the flow control procedure, if the high priority bandwidth quota of the source device 22 is used up, the flow control unit 211 will temporarily degrade the first packet to a specific low priority level (denoted as a second priority level below) and determine whether to output the first packet according to a comparison result of the target priority level and the second priority level. For example, when the second priority level is higher than or equal to the target priority level, it is determined to output the first packet; when the second priority level is lower than the target priority level, it is determined not to output the first packet. Thus, if the first packet can be outputted in this condition, it is achieved not by consuming the high priority bandwidth quota of the source device 22, and thus the second priority level can be regarded as a Best-Effort level without a guaranteed bandwidth. Nonetheless, once outputted, the degraded first packet is restored to the original first priority level. In addition, when the flow control unit 211 regains at least a part of the high priority bandwidth quota, the flow control unit 211 also restores the degraded first packet to the first priority level if it has not been outputted yet.

The first priority level can be assigned by the source device 22 or the flow control unit 211, while the second priority level can be assigned by the flow control unit 211.

In one embodiment, when the first priority level is a highest priority level, it means the first packet has top priority and should be forwarded as soon as possible. Thus, the flow control unit 211 directly outputs this kind of high priority packet without performing the flow control procedure; when the first priority level is a high priority level rather than the highest priority level, the flow control unit 211 still performs the flow control procedure for the first packet.

The purpose of defining the high priority bandwidth quota for the source device 22 is that the high priority packet issued from the source device 22 is allowed consuming only a part of total bandwidth of the target device 23, so as to assure that there is remaining bandwidth reserved for the low priority packet (no matter issued from the source device 22 or 24). Otherwise, if the high priority packet is allow consuming the total bandwidth of the target device 23 without limit, then since the high priority packet is always forwarded firstly by the switch network 21, the low priority packet may be delayed too much before being forwarded, such that the performance of the network system 20 is reduced.

The purpose of temporarily degrading the first packet to the low priority level, when the high priority bandwidth quota of the source device 22 is used up, is to enable the first packet to share the remaining bandwidth of the target device 23 with other low priority packets. As long as the priority level of the degraded first packet (i.e. the second priority level) is higher than or equal to the target priority level, the degraded first packet can be outputted to the switch unit 212. That is, the second priority level is used here to plan the distribution of the remaining bandwidth. The higher the second priority level is set, the more remaining bandwidth this kind of temporarily degraded packet can consume and thus the less remaining bandwidth other low priority packets can consume. The distribution of the remaining bandwidth available for the other low priority packets is executed by the switch unit 212 and will be explained below.

In one embodiment, the flow control unit 211 comprises a lookup table (not shown in FIG. 2) for storing a correspondence between a target identifier of the target device 23 and the target priority level. When performing the flow control procedure, the flow control unit 211 decodes a destination address of the first packet to generate the target identifier, which is then used to look up the lookup table to acquire the corresponding target priority level. In addition, when the scheduling unit 213 returns a new target priority level (which will be described later), the flow control unit 211 dynamically updates the lookup table.

Figure 3:
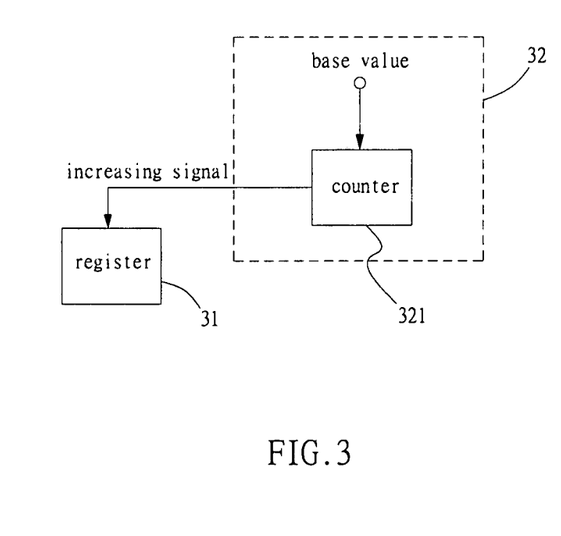
FIG. 3 shows the internal architecture of the flow control unit in FIG. 2 used to realize rate-based scheduling.

In another embodiment, the flow control unit 211 allocates bandwidth in a manner of rate-based scheduling, which allocates the bandwidth to each source device by distributing each unit time according to a predetermined proportion of each source device. For example, if each unit time contains 100 system clocks, then a source device with a 30% proportion of bandwidth will have 30 clocks available for communication within each 100 clocks. FIG. 3 shows the internal architecture of the flow control unit 211 used to realize the rate-based scheduling. In FIG. 3, a register 31 is used to store an available high priority bandwidth of the source device 22, which has an upper limit (i.e. the high priority bandwidth quota of the source device 22) and a lower limit; a signal generating unit 32 is used to generate an increasing signal to the register 31 for every predetermined period of time, so as to progressively increase the available high priority bandwidth of the source device 22. When the available high priority bandwidth is represented by the number of packets, the flow control unit 211 decreases the available high priority bandwidth stored in the register 31 by one when outputting a high priority packet. The signal generating unit 32 comprises a counter 321 which is initially set as a base value and decreased by one for every system clock. When the counter 321 is decreased to zero, the increasing signal is generated and the counter 321 is restored to the base value. For instance, if 15 system clocks are spent by the source device 22 from issuing a high priority packet to receiving a reply of the target device 23 (in the point-to-point protocol, after issuing a packet or request, the source device can issue a next packet or request only after receiving a reply of the target device), then when the rate-based scheduling is performed with the unit time of 100 system clocks and also the high priority bandwidth quota is 30%, it means two packets (i.e. (100*30%)/15=2) can be sent out for every 100 system clocks. In this situation, the base value can be set as 50, and thus the value of the register 31 is increased by two for every 100 clocks, where the high priority bandwidth quota is then two.

When performing the flow control procedure, the flow control unit 211 references the available high priority bandwidth stored in the register 31. When the available high priority bandwidth is equal to or smaller than zero, it means the high priority bandwidth quota of the source device 22 is used up. The lower limit of the high priority bandwidth quota is negative, which represents a maximal high priority bandwidth that can be drawn in advance by the source device 22. As mentioned above, when the high priority bandwidth quota is used up, the flow control unit 211 will temporarily degrade a high priority packet to be forwarded. If the priority level of the degraded high priority packet is higher than or equal to the target priority level, the degraded high priority packet can still be outputted by consuming the high priority bandwidth in advance.

The flow control unit 211 can include a parameter register (not shown in FIG. 2) for storing parameters required for operation of the flow control procedure, e.g. the second priority level, the upper and lower limits of the register 31, etc., thereby facilitating dynamical adjustments of the parameters. Since the related parameters can be dynamically adjusted, the flow control unit 211 can perform the QoS management more elastically and adaptively.

When both the flow control unit 211 and the source device 24 have packets to be forwarded, e.g. the first packet outputted by the flow control unit 211 and the second packet issued by the source device 24, the switch unit 212 determines the forwarding sequence of the first and second packets according to a packet arbitration policy, which is configured as that a high priority packet is forwarded firstly and a low priority packet is forwarded secondly. When both the first and second packets are low priority packets, the packet arbitration policy can determine their forwarding sequence in several ways, e.g. determining the forwarding sequence according to a comparison result of the priority levels of the first and second packets, or forwarding the first and second packets in turn, i.e. Round-Robin scheduling.

In a preferred embodiment, a first path and a second path connect between the flow control unit 211 and the switch unit 212. The first packet outputted by the flow control unit 211 is sent to the switch unit 212 via the first path. Before outputting the first packet, the flow control unit 211 issues in advance a corresponding token of the first packet to the switch unit 212 via the second path, so as to inform the switch unit 212 that the first packet will pass the first path soon and wait to be forwarded by the switch unit 212. The corresponding token of the first packet can inform the switch unit 212 that the first packet is a high priority packet or a low priority packet. Thus, according to this token, the switch unit 212 can increase a high priority weight or a low priority weight by one, where the high priority weight and the low priority weight respectively indicate an amount of high priority packets and an amount of low priority packets to be forwarded on the first path. Relatively, each time when the switch unit 212 forwards a packet on the first path, the high or low priority weight will be decreased by one. When the switch unit 212 executes the packet arbitration policy to determine the forwarding sequence of the first packet, if the high priority weight is not zero at this time (i.e. there is at least one subsequent high priority packet to be forwarded on the first path) and if the first packet is the low priority packet, the packet arbitration policy will determine the forwarding sequence of the first packet by regarding the first packet as the high priority packet, so as to advance the forwarding of the first packet. In this manner, the subsequent high priority packet to be forwarded can also be forwarded in advance to shorten the latency of the high priority packet.

In another preferred embodiment, a buffer (not shown in FIG. 2) is deployed on the first path to temporarily store the low priority packet which is outputted by the flow control unit 211 and waits to be forwarded by the switch unit 212. On the other hand, the high priority packet outputted by the flow control unit 211 is directly sent to the switch unit 212 via the first path. Thus, the low priority weight mentioned above can indicate an amount of low priority packets stored in this buffer, and when the low priority weight is larger than a warning value, it means the buffer is near full. When the switch unit 212 executes the packet arbitration policy to determine the forwarding sequence of the first packet, if the low priority weight is larger than the warning value and the first packet is the low priority packet stored in the buffer, then since the remaining space of the buffer is few, the packet arbitration policy will determine the forwarding sequence of the first packet by regarding the first packet as the high priority packet, so as to advance the forwarding of the first packet. In this manner, more space in the buffer can be emptied for storing the subsequent low priority packets outputted by the flow control unit 211. Otherwise, if the buffer becomes full, the flow control unit cannot output the low priority packet any more, and congestion will occur accordingly.

In FIG. 2, the switch unit 212 performs arbitration for the packets issued by the flow control unit 211 and the source device 24, that is, the switch unit 212 performs the packet arbitration between two channels, one of which comes from the flow control unit 211 and the other from the source device 24. In one embodiment, the switch unit 212 can perform packet arbitration among more than two channels, where each channel may come from the flow control unit, the source device or a previous switch unit. Furthermore, in each channel, the first and second paths and the buffer are deployed as the two-channel case mentioned above. Thus, when performing the packet arbitration, the switch unit 212 can consider the high and low priority weights of all channels, so as to firstly forward the high priority packet or the low priority packet regarded as the high priority packet, and then forward other low priority packets according to their priority levels or Round-Robin scheduling.

The switch unit 212 can include a parameter register (not shown in FIG. 2) for storing parameters required for operation of the packet arbitration policy, e.g. the high priority weight, the low priority weight, the warning value, etc., thereby facilitating dynamical updates or adjustments of the parameters. Since the related parameters can be dynamically updated or adjusted, the switch unit 212 can perform the QoS management more elastically and adaptively.

The scheduling unit 213 includes a queue for receiving the first and second packets forwarded by the switch unit 212, and performs scheduling according to the priority levels of the first and second packets so as to determine a sequence for the first and second packets to enter the target device 23, e.g. the packet with a higher priority level can enter the target device 23 earlier. When a packet enters the target device 23, the scheduling unit 214 updates the target priority level of the target device 23 as the corresponding priority level of this packet, and informs the flow control unit 21 of the updated target priority level. For example, when the first packet enters the target device 23, the scheduling unit 213 updates the target priority level as the first priority level. There is no need for the scheduling unit 213 to real time inform of the updated target priority level. Thus, in one embodiment, by utilizing the response phase in the OCP protocol, the scheduling unit 213 can feedback the updated target priority level to the flow control unit 211 when the response is null in the response phase. In this manner, no extra sideband is needed to transmit the information about the updated target priority level, and thus the hardware circuits can be simplified to facilitate integration and re-use.

In one embodiment, when the queue of the scheduling unit 213 is empty (i.e. the target device 23 is idle), the scheduling unit updates the target priority level as a lowest priority level and informs the flow control unit 211 of the updated target priority level. Thus, when the source device 22 issues a high priority packet, the flow control nit 211 can output the high priority packet to the switch unit 212, no matter the high priority bandwidth quota is used up. Therefore, the packets issued by all the source devices (i.e. the source devices 22 and 24), no matter their corresponding priority levels are, can be sent to the switch unit 212 and wait for arbitration to enter the scheduling unit 213. In other words, when the target device 23 is idle, all the source devices have the right to request the service of the target device 23.

In sum, the network system 20 can perform the QoS management by the division of labor among the flow control unit 211, the switch unit 212 and the scheduling unit 213, where the flow control unit 211 performs the flow control of high priority packets according to the high priority bandwidth quota; the switch unit 212 distributes the remaining bandwidth to low priority packets; the scheduling unit 213 informs the flow control unit 211 of the current target priority level for use in performing the flow control.

The present invention can be applied to a NoC system, so as to perform QoS management for the NoC system. For example, the network system 20 in FIG. 2 can be extended to a NoC system comprising plural source devices and target devices respectively coupled to the switch network 21; the source device can be a direct memory access (DMA) controller, a digital signal processor (DSP), an application processor or other peripheral components; the target device can be a DRAM controller, an internal memory controller, etc.

Figure 4:
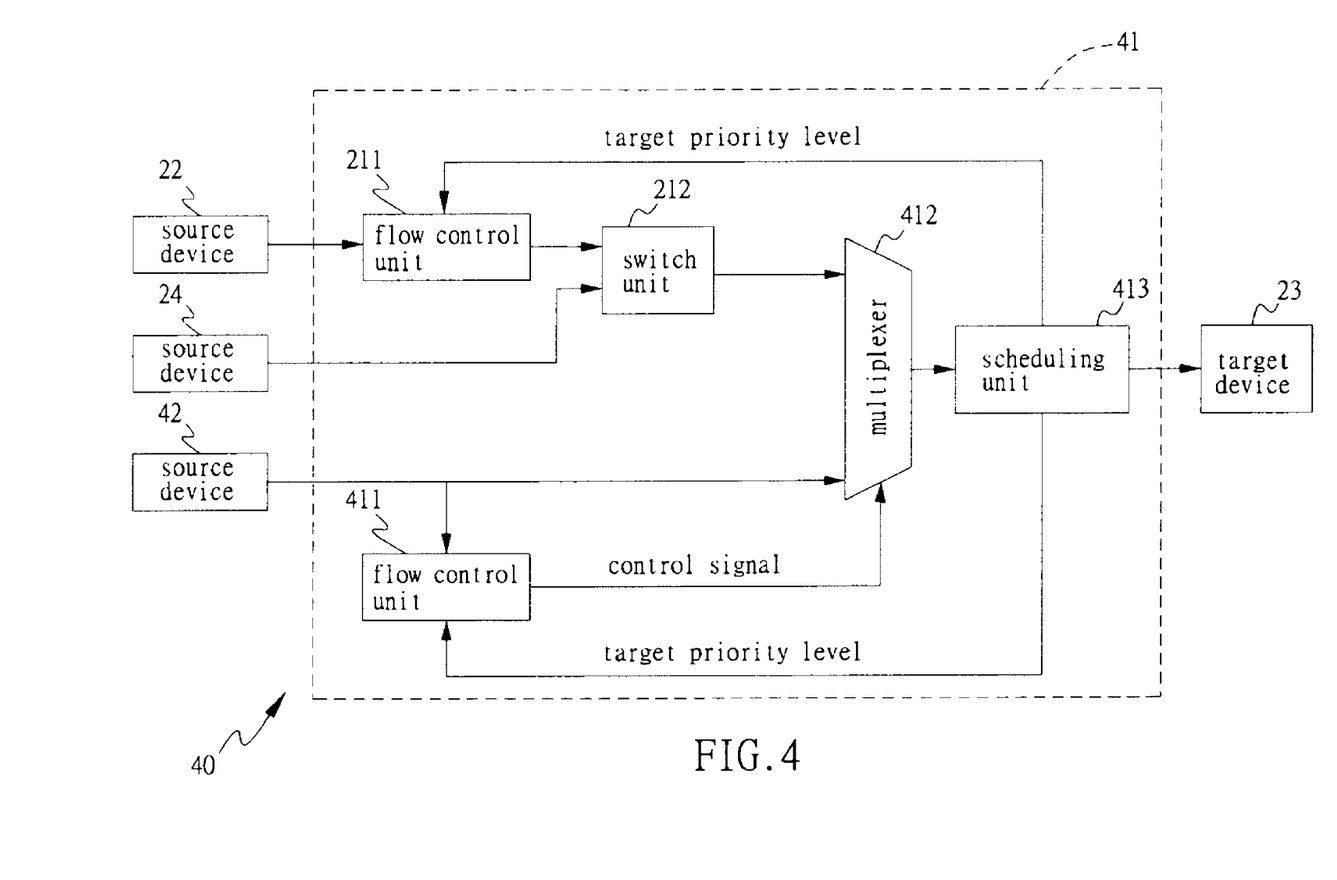
FIG. 4 is a diagram showing the architecture of a preferred embodiment of the network system with QoS management according to the present invention.

FIG. 4 is a diagram showing the architecture of a preferred embodiment of the network system with QoS management according to the present invention. Compared with the network system 20 of FIG. 2, the switch network 41 in the network system 40 of FIG. 4 adds a shortcut for the source device 42, such that a high priority packet (denoted as a third packet below) issued from the source device 42 can reach the target device 23 rapidly without need of the arbitration of the switch unit 212 and the scheduling of the scheduling unit 413. In FIG. 4, the third packet issued from the source device 42 is sent into the flow control unit 411 and the multiplexer 412 respectively. The flow control unit 411 performs a flow control procedure, similar to that performed by the flow control unit 211, according to the target priority level of the target device 23 and a high priority bandwidth quota of the source device 42, and issues a control signal to the multiplexer 412 so as to control whether to allow the third packet to pass the multiplexer 412. The multiplexer 412 receives the outputs of both the source device 42 and the switch unit 212, and selects one of them for output to the scheduling unit 413 according to the control signal.

The scheduling unit 413 includes a low priority path and a high priority path. A buffering unit (not shown in FIG. 4) is deployed on the low priority path, while a filtering unit (not shown in FIG. 4) is deployed on the high priority path. When the packet outputted by the multiplexer 412 is a low priority packet, the scheduling unit 413 stores the low priority packet to the buffering unit; when the packet outputted by the multiplexer 412 is a high priority packet, the scheduling unit 413 forwards the high priority packet to the target device 23 via the high priority path. The filtering unit deployed on the high priority path can filter out packets whose destinations are not the target device 23. In one embodiment, the source device 41 and the target device 23 can be an application processor and a DRAM controller, where the external frequency of the application processor can be synchronized with the DRAM controller so as to provide better performance.

Figure 5:
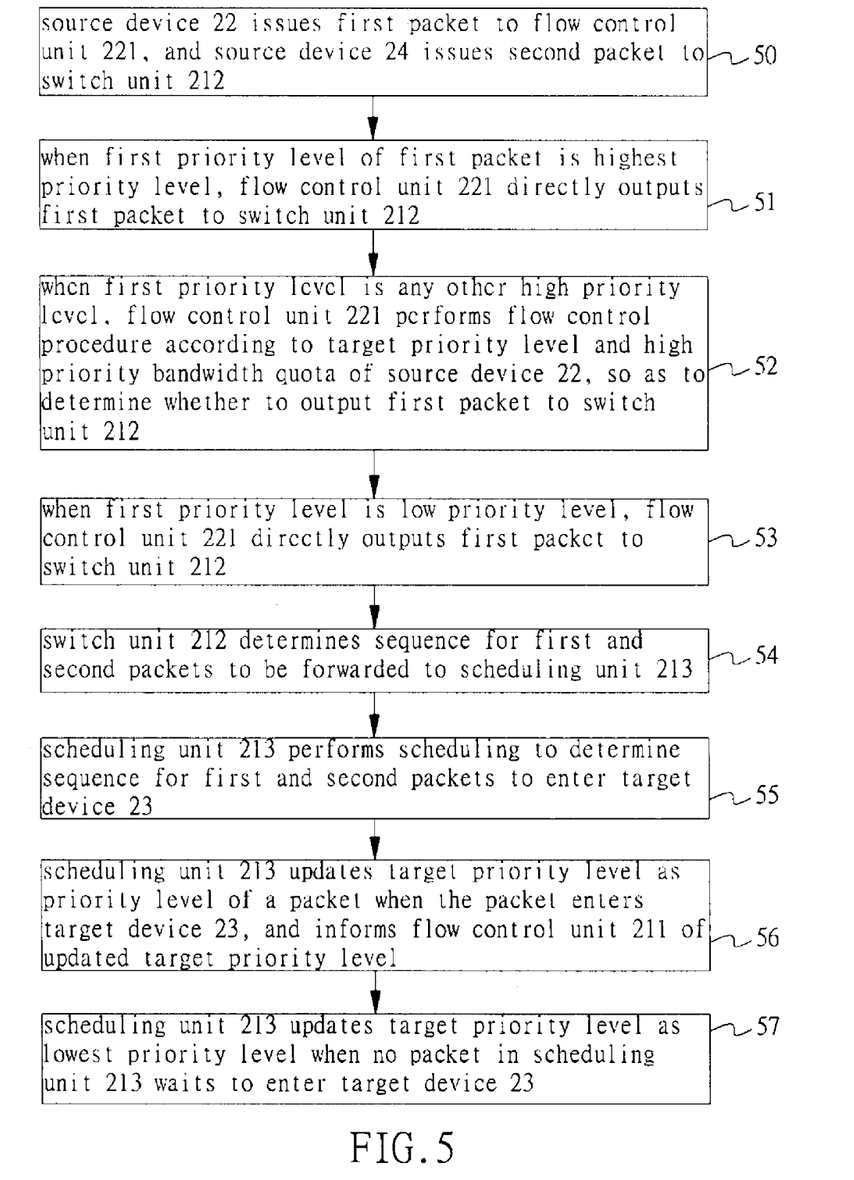
FIG. 5 is a flow chart of a QoS management method used in the network system as shown in FIG. 2 and FIG. 4 according to an embodiment of the present invention.

FIG. 5 is a flow chart of a QoS management method used in the network system as shown in FIG. 2 and FIG. 4 according to an embodiment of the present invention. The QoS management method comprises steps as follows:

Step 50: the source device 22 issues the first packet to the flow control unit 221, and the source device 24 issues the second packet to the switch unit 212.

Step 51: when the first priority level of the first packet is the highest priority level, the flow control unit 221 directly outputs the first packet to the switch unit 212.

Step 52: when the first priority level is any other high priority level, the flow control unit 221 performs the flow control procedure according to the target priority level and the high priority bandwidth quota of the source device 22, so as to determine whether to output the first packet to the switch unit 212.

Step 53: when the first priority level is the low priority level, the flow control unit 221 directly outputs the first packet to the switch unit 212.

Step 54: the switch unit 212 determines the sequence for the first and second packets to be forwarded to the scheduling unit 213.

Step 55: the scheduling unit 213 performs scheduling to determine the sequence for the first and second packets to enter the target device 23.

Step 56: the scheduling unit 213 updates the target priority level as the priority level of a packet when the packet enters the target device 23, and informs the flow control unit 211 of the updated target priority level.

Step 57: the scheduling unit 213 updates the target priority level as the lowest priority level when there is no packet in the scheduling unit 213 waiting to enter the target device 23.

Since the steps 50~57 have been explained in detail as above, the explanation for these steps is omitted here.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A network system comprising:
   a switch network;
   a target device coupled to the switch network, wherein the target device corresponds to a target priority level; and
   a first source device and a second source device for respectively issuing a first packet and a second packet to the target device via the switch network, wherein the first packet corresponds to a first priority level;
   wherein the switch network comprises:
      a flow control unit, coupled to the first source device, for receiving the first packet, and in response to the first priority level being a high priority, performing a flow control procedure according to both the target priority level and a high priority bandwidth quota of the first source device, wherein the high priority bandwidth quota represents a number of high priority packets the first source device is allowed to output within a predetermined period of time, wherein the flow control unit determines whether to output the first packet based on the flow control procedure; and in response to the first priority level being a low priority, the flow control unit directly outputs the first packet;
      a switch unit, coupled to the flow control unit and the second source device, for determining a forwarding sequence of the first and second packets according to a packet arbitration policy, the switch unit further comprising a parameter register for storing parameters associated with the packet arbitration policy; and
      a scheduling unit for receiving the first and second packets from the switch unit and determining a sequence for the first and second packets to enter the target device, wherein the scheduling unit updates the target priority level as a priority level of a packet which enters the target device, and informs the flow control unit of the updated target priority level.

2. The network system of claim 1, wherein the first priority level is assigned by the first source device or the flow control unit.

3. The network system of claim 1, wherein when performing the flow control procedure, the flow control unit determines whether to output the first packet according to a comparison result of the target priority level and the first priority level if the high priority bandwidth quota of the first source device is not used up.

4. The network system of claim 3, wherein when performing the flow control procedure, the flow control unit temporarily degrades the first packet to a second priority level and determines whether to output the first packet according to a comparison result of the target priority level and the second priority level if the high priority bandwidth quota of the first source device is used up.

5. The network system of claim 4, wherein when the flow control unit regains at least a part of the high priority bandwidth quota, the flow control unit restores the first packet to the first priority level if the first packet has not been outputted yet.

6. The network system of claim 4, wherein the second priority level is the low priority level.

7. The network system of claim 4, wherein the flow control unit comprises:
   a register for storing an available high priority bandwidth which has an upper limit corresponding to the high priority bandwidth quota of the first source device; and
   a signal generating unit for generating an increasing signal to the register for every predetermined period of time, so as to progressively increase the available high priority bandwidth.

8. The network system of claim 7, wherein the flow control unit decreases the available high priority bandwidth each time when the flow control unit outputs a high priority packet with the high priority level.

9. The network system of claim 1, wherein the flow control unit comprises a lookup table for storing a correspondence between a target identifier of the target device and the target priority level.

10. The network system of claim 9, wherein when performing the flow control procedure, the flow control unit generates the target identifier according to a destination address of the first packet, wherein the target identifier is used to look up the lookup table to acquire the target priority level.

11. The network system of claim 1, wherein the packet arbitration policy is configured as that a high priority packet with the high priority level is forwarded firstly and a low priority packet with the low priority level is forwarded secondly.

12. The network system of claim 11, wherein a first path and a second path connect between the flow control unit and the switch unit, wherein the flow control unit issues a corresponding token of the first packet to the switch unit via the second path before outputting the first packet to the switch unit via the first path, so as to inform the switch unit that the first packet will pass the first path soon.

13. The network system of claim 1, wherein the second packet is corresponding to a third priority level, and when both the first and second packets are packets with the low priority level, the switch unit determines the forwarding sequence of the first and second packets according to the first and third priority levels.

14. The network system of claim 1, wherein the scheduling unit updates the target priority level as a lowest priority level when no packet waits to enter the target device.

15. The network system of claim 1, further comprising:
a third source device, coupled to the switch unit, for issuing a third packet with the high priority level;
wherein the switch network further comprises:
a second flow control unit, coupled to the third source device, for performing a second flow control procedure according to the target priority level and a high priority bandwidth quota of the third source device, so as to output a control signal; and
a multiplexer, coupled between the switch unit and the scheduling unit and coupled to the third source device, for selecting one of the third source device and the switch unit for output a packet to the scheduling unit.

16. A Quality of Service (QoS) management method used in a network system comprising a first source device, a second source device, a target device corresponding to a target priority level, a flow control unit, a switch unit and a scheduling unit, the QoS management method comprising:
the first source device issuing a first packet to the flow control unit, and the second source device issuing a second packet to the switch unit, wherein the first packet corresponds to a first priority level;
the flow control unit performing a flow control procedure according to both the target priority level and a high priority bandwidth quota of the first source device in response to the first priority level being a high priority level, wherein the high priority bandwidth quota represents a number of high priority packets the first source device is allowed to output within a predetermined period of time;
the flow control unit determining whether to output the first packet to the switch unit based on the flow control procedure;
the flow control unit directly outputting the first packet to the switch unit in response to the first priority level being a low priority level;
the switch unit determining a sequence for the first and second packets to be forwarded to the scheduling unit according to a packet arbitration policy, the switch unit further comprising a parameter register for storing parameters associated with the packet arbitration policy;
the scheduling unit determining a sequence for the first and second packets to enter the target device; and
the scheduling unit updating the target priority level as a priority level of a packet when the packet enters the target device, and informing the flow control unit of the updated target priority level.

17. The QoS management method of claim 16, further comprising:
the flow control unit directly outputting the first packet to the switch unit when the first priority level is a highest priority level.

18. The QoS management method of claim 16, wherein the flow control procedure comprises:
determining whether to output the first packet according to a comparison result of the target priority level and the first priority level if the high priority bandwidth quota of the first source device is not used up.

19. The QoS management method of claim 16, wherein a packet arbitration policy is configured as that a high priority packet with the high priority level is forwarded firstly and a low priority packet with the low priority level is forwarded secondly.

20. The QoS management method of claim 19, wherein a first path and a second path connect between the flow control unit and the switch unit, the QoS management method further comprises:
the flow control unit issuing a corresponding token of the first packet to the switch unit via the second path before outputting the first packet to the switch unit via the first path, so as to inform the switch unit that the first packet will pass the first path soon.

21. The QoS management method of claim 20, wherein the step of determining the sequence for the first and second packets to be forwarded to the scheduling unit comprises:
updating a high priority weight according to the corresponding token of the first packet, wherein the high priority weight indicates an amount of the high priority packets to be forwarded on the first path; and
determining the forwarding sequence of the first packet by regarding the first packet as the high priority packet if the high priority weight is not zero and the first packet is the low priority packet.

22. The QoS management method of claim 20, wherein a buffer is deployed on the first path for temporarily storing the low priority packet which is outputted by the flow control unit, and the step of determining the sequence for the first and second packets to be forwarded to the scheduling unit comprises:
updating a low priority weight according to the corresponding token of the first packet, wherein the low priority weight indicates an amount of the low priority packets stored in the buffer; and
determining the forwarding sequence of the first packet by regarding the first packet as the high priority packet if the low priority weight is larger than a warning value and the first packet is the low priority packet stored in the buffer.

23. The QoS management method of claim 16, wherein the second packet is corresponding to a third priority level, and the step of determining the sequence for the first and second packets to be forwarded to the scheduling unit comprises:
  determines the forwarding sequence of the first and second packets according to the first and third priority levels when both the first and second packets are packets with the low priority level.

24. The QoS management method of claim 16, wherein the step of determining the sequence for the first and second packets to be forwarded to the scheduling unit comprises:
  determines the forwarding sequence of the first and second packets by performing Round-Robin scheduling when both the first and second packets are packets with the low priority level.

25. The QoS management method of claim 16, wherein the second packet is corresponding to a third priority level, and the sequence for the first and second packets to enter the target device is determined according to the first and third priority levels.

26. A network system comprising:
  a switch network;
  a target device coupled to the switch network; and
  a first source device and a second source device for respectively issuing a first packet and a second packet to the target device via the switch network, wherein the first packet corresponds to a first priority level;
  wherein the switch network comprises:
    a flow control unit, coupled to the first source device, for receiving the first packet, and in response to the first priority level being a high priority, performing a flow control procedure according to both a priority level of the target device and a high priority bandwidth quota of the first source device, wherein the high priority bandwidth quota represents a number of high priority packets the first source device is allowed to output within a predetermined period of time, and wherein the flow control unit directly outputs the first packet to a buffer in response to the first priority level being a low priority;
    a switch unit, coupled to the flow control unit and the second source device, for determining a forwarding sequence of the first and second packets according to a packet arbitration policy, the switch unit further comprising a parameter register for storing parameters associated with the packet arbitration policy; and
    a scheduling unit for receiving the first and second packets from the switch unit and determining a sequence for the first and second packets to enter the target device, wherein the scheduling unit updates the target priority level as a priority level of a packet which enters the target device, and informs the flow control unit of the updated target priority level.

* * * * *